United States Patent
Northrop et al.

(10) Patent No.: US 10,796,056 B2
(45) Date of Patent: Oct. 6, 2020

(54) OPTIMIZING LIBRARY CELLS WITH WIRING IN METALLIZATION LAYERS

(71) Applicant: GLOBALFOUNDRIES INC., Grand Cayman (KY)

(72) Inventors: Gregory A. Northrop, Ballston Spa, NY (US); Lionel Riviere-Cazaux, Clifton Park, NY (US); Lars Liebmann, Mechanicville, NY (US); Kai Sun, Clifton Park, NY (US); Norihito Nakamoto, Clifton Park, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 205 days.

(21) Appl. No.: 16/014,287

(22) Filed: Jun. 21, 2018

(65) Prior Publication Data

US 2019/0392106 A1 Dec. 26, 2019

(51) Int. Cl.
| | |
|---|---|
| *G06F 30/00* | (2020.01) |
| *G06F 30/392* | (2020.01) |
| *G03F 1/36* | (2012.01) |
| *G06F 30/398* | (2020.01) |
| *H01L 21/78* | (2006.01) |
| *G06F 111/04* | (2020.01) |
| *G06F 111/20* | (2020.01) |

(52) U.S. Cl.
CPC .......... *G06F 30/392* (2020.01); *G03F 1/36* (2013.01); *G06F 30/398* (2020.01); *G06F 2111/04* (2020.01); *G06F 2111/20* (2020.01); *H01L 21/78* (2013.01)

(58) Field of Classification Search
CPC .................................................. G06F 30/398
USPC .......................................................... 716/122
See application file for complete search history.

(56) References Cited

U.S. PATENT DOCUMENTS

| | | |
|---|---|---|
| 5,801,960 A | 9/1998 | Takano et al. |
| 5,818,726 A | 10/1998 | Lee |
| 6,446,245 B1 | 9/2002 | Xing et al. |
| (Continued) | | |

OTHER PUBLICATIONS

Xu et al., "Self-Aligned Double Patterning Aware Pin Access and Standard Cell Layout Co-Optimization," IEEE Transactions on Computer-Aided Design of Integrated Circuits and Systems, vol. 34, Issue 5, 2015, pp. 1-8.

*Primary Examiner* — Suchin Parihar
(74) *Attorney, Agent, or Firm* — Gibb & Riley, LLC; David A. Cain, Esq.

(57) ABSTRACT

Original cell design rule violations with respect to a second wiring layer are identified, while conductors of the second wiring layer are in an original position. The conductors of the second wiring layer are offset into different offset positions, and then the process of identifying violations is repeated for each of the offset positions. With this, metrics are generated for the original cell for the original position and each of the offset positions. Then, the original cell or the pitch of the second wiring layer are altered to produce alterations. The processes of identifying violations, offsetting conductors in the second wiring layer, repeating the identification of violations for all offsets, and generating metrics are repeated for each of the alterations. The original cell or one of the alterations is then selected, based on which cell produces the lowest number of violations of the design rules.

17 Claims, 9 Drawing Sheets

(56) References Cited

U.S. PATENT DOCUMENTS

| | | | |
|---|---|---|---|
| 6,892,368 B2 | 5/2005 | Li et al. | |
| 7,031,419 B2 | 4/2006 | Piirainen | |
| 7,469,389 B2 | 12/2008 | Namba et al. | |
| 9,183,343 B1 * | 11/2015 | Salowe | G06F 30/394 |
| 2002/0035720 A1 * | 3/2002 | Kitamura | G06F 30/394 |
| | | | 716/126 |
| 2009/0083689 A1 * | 3/2009 | Ringe | G06F 30/394 |
| | | | 716/126 |
| 2020/0019670 A1 * | 1/2020 | Chang | G06F 30/392 |

\* cited by examiner

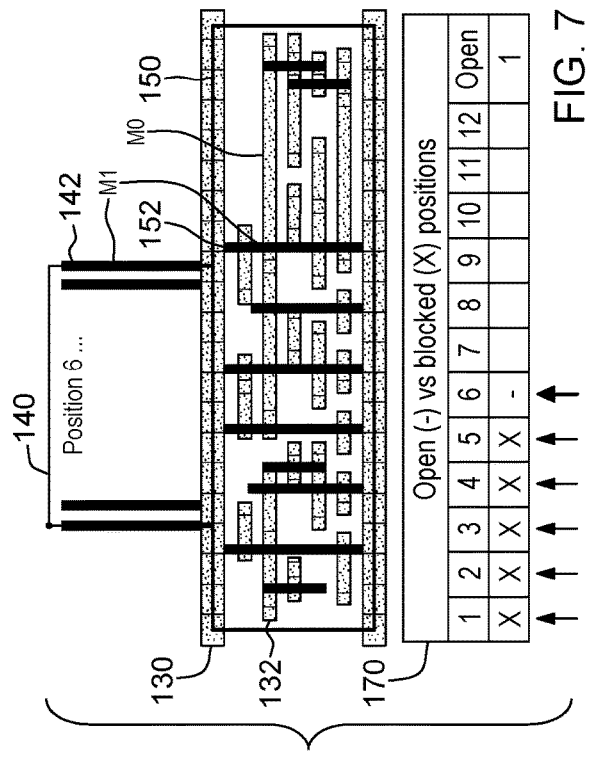
FIG. 6
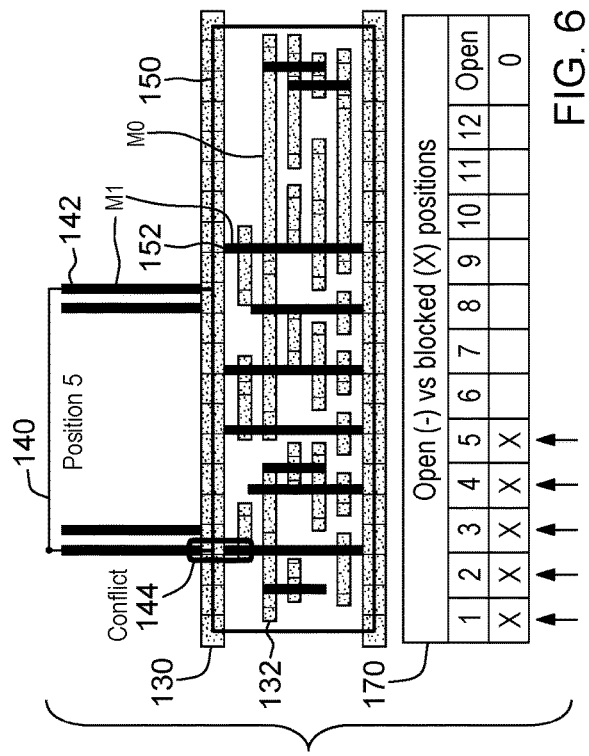
FIG. 7
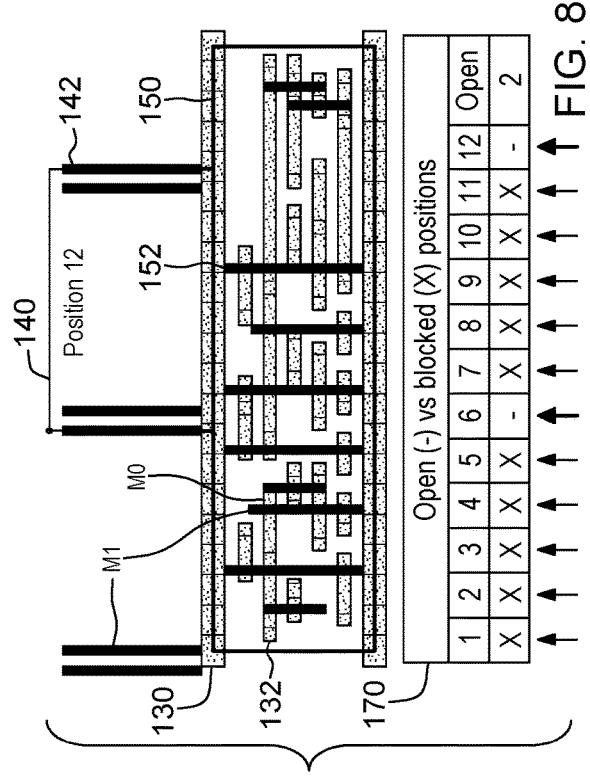
FIG. 8
FIG. 9

OPTIMIZING LIBRARY CELLS WITH WIRING IN METALLIZATION LAYERS

BACKGROUND

Field of the Invention

The present disclosure relates to designing and manufacturing integrated circuit devices, and more specifically, to optimizing library cells with wiring in metallization layers.

Description of Related Art

During the production of integrated circuit devices, designers establish logical operations that will achieve a desired goal for a device. Once the designer has programmed the operation of the logic circuit, the program is generated using an automated generation tool and, then synthesized using standard cells from a library containing such cells. Standard cells are previously created and verified components, such as logic gates, latches, decoders, and various other components. The synthesis is typically an automated process in which a synthesis tool determines the appropriate standard cells to use, and determines interconnections between standard cells, to realize a circuit that satisfies the designer's operation of the logic circuit.

Once synthesized, the device is ready for physical design, which involves physical placement of the standard cells and the routing of interconnections (wires). Physical designers typically use automated tools to aid in placement and routing. Once the physical design is complete, process masks are created by a mask house from the generated layout, and those process masks are used in a chip foundry to manufacture the desired integrated circuit from semiconductor materials (e.g., silicon wafers). However, sometimes during placement/routing, conductors that are designed to be insulated from one another can be placed too close to one another (possibly causing unexpected and undesirable short circuits), or conductors that are designed to contact one another may not overlap one another sufficiently to provide a reliable connection (possibly causing unexpected and undesirable open circuits); and these are sometimes referred to as spacing or overlap rule violations.

SUMMARY

Various methods herein receive logical operations that are to be performed by a hardware component (from a designer) that are input into components of design interface, such as inputs into a graphic user interface (GUI) of a computer aided design (CAD) application. Further, these methods produce or receive a wiring layout of a first wiring layer (which can be, for example the M0 level) and a second wiring layer (which can be, for example the M1 level) of a multi-level integrated circuit design. The first wiring layer is separated from the second wiring layer by an insulator layer (e.g., such as an inter-layer dielectric (ILD) with vias connecting M0 and M1). Also, the first wiring layer can sometimes have an irregular pattern of electrical conductors while, in contrast, the second wiring layer has a regular pattern of electrical conductors separated by areas reserved for cells.

Additionally, these methods automatically produce an integrated circuit design that accomplishes the logical operations supplied from the designer, using a generation component of such systems. To produce the integrated circuit design, these methods automatically select cells of the integrated circuit design from a library of cells to perform the logical operations received from the designer. In such processing, the methods herein automatically determine interconnections between the cells of the integrated circuit design. Then, such methods physically place a cell (e.g., an "original" cell having conductive circuit elements) within the second wiring layer to align with connections through the insulator layer to the first wiring layer.

Next, the methods herein identify violations of whether any of the conductive circuit elements of the original cell violate design rules (e.g., spacing or overlap violations) with respect to the conductors of the second wiring layer (while the conductors of the second wiring layer are in an original position). Such methods then offset the conductors of the second wiring layer in steps from the original position to all possible different offset positions. In greater detail, this processing uses all offset positions the conductors of the second wiring layer are capable of being moved, as restricted by design constraints. For each of these possible offset positions, the methods herein repeat the process of identifying violations (without moving or changing the original cell in the second wiring layer). This allows these methods to generate a first metric for the original cell based on all the violations that were identified (during the initial process of identifying violations and the repeated processes of identifying violations for all offsets) for original position and each of the different offset positions.

Once this is completed, these methods then alter the original cell or the pitch of the second wiring layer to produce alterations to the original cell or the pitch of the second wiring layer. This can involve altering internal conductive components within the original cell that allow the altered cell to maintain, relative to the original cell, the same functionality and the same alignment to the connections to the first wiring layer. Such cell alterations still allow the altered cell to maintain the same functionality and alignment to the connections to the first wiring layer as the original cell. Further, such alterations only change positions of the conductive circuit elements within the cell and do not change position of the cell within the second wiring layer from the position of the original cell. Alternatively, such alterations can alter the pitch of the conductors of the second wiring layer. Then, for each of such alterations, these methods repeat the process of identifying violations, the process of offsetting the conductors of the second wiring layer, the process of repeating identifying violations for each offset position of the conductors of the second wiring layer, and then generating metrics for each altered functional cell based on all the violations that were identified for that altered functional cell for each of the different offset positions.

In greater detail, such metrics are generated by determining (for the original cell and for the alterations) whether a violation occurs at each position of the conductors of the second wiring layer for the original position of the conductors, and for each of the offset positions; and calculating a number of violations of all positions of the conductors of the second wiring layer for the original cell to produce a first metric (and separately for each of the alterations, to produce many altered metrics). Once this is finished for the original cell and all the alterations, such methods select the cell that produces the optimized violation metric as a selected design feature. With this, these methods then place the selected design feature in an integrated circuit design. Such methods then route connections between cells of the integrated circuit design and these methods route power connections from the second wiring layer to the selected cell, and this produces a finalized integrated circuit design. Then, masks are generated from the finalized integrated circuit design. Such methods then use these masks within manufacturing equipment to produce wafers. The wafers are subsequently divided into integrated circuit devices as fully functional manufactured devices.

Also, systems herein include a design interface component that includes input components that receive logical operations that are to be performed by a hardware component from a designer. A generation component is included that automatically produces an integrated circuit design that accomplishes the logical operations supplied from the designer. Further, manufacturing machines are components that produce integrated circuits according to the integrated circuit design.

In greater detail, the generation component is directly or indirectly connected to a storage component that maintains a library of cells. Additionally, the generation component includes a synthesis component that automatically selects cells of the integrated circuit design from the library of cells to perform the logical operations from received the designer. The generation component additionally automatically determines interconnections between the cells of the integrated circuit design. The generation component also includes a placement component that automatically places the cells of the integrated circuit design within the second wiring layer of a multi-level integrated circuit design. Again, the second wiring layer is separated from a first wiring layer by an insulator layer in the multi-level integrated circuit design, and the first wiring layer can sometimes have an irregular pattern of electrical conductors, but the second wiring layer has a regular pattern of electrical conductors separated by areas reserved for cells.

A routing component is included as part of the generation component, and the routing component automatically routes conductors forming the interconnections, including interconnections between the cells of the integrated circuit design and connections between the cells of the integrated circuit design and power supplies in the second wiring layer.

In greater detail, the placement component automatically positions an original cell that has conductive circuit elements within the second wiring layer to align with connections through the insulator layer to the first wiring layer. Then, the generation component automatically identifies violations of whether any of the conductive circuit elements of the original cell violate design rules with respect to the conductors of the second wiring layer (while the conductors of the second wiring layer are in an original position).

After this, the generation component automatically offsets the conductors of the second wiring layer from the original position into different offset positions (into all offset positions the conductors of the second wiring layer are capable of being moved as restricted by design constraints). Then, the generation component can automatically repeat the process of identifying violations for each of the offset positions (without moving the original cell in the second wiring layer). This allows the generation component to automatically generate a first metric for the original cell, based on all violations identified for the original position and each of the offset positions.

Following this, the generation component automatically alters the position, size, shape, etc., of internal conductive components of the original cell (while still allowing the original cell to maintain the same functionality and alignment to the connections to the first wiring layer as the original cell) or alters the pitch of the second wiring layer to produce alterations. When altering the positions of the conductive circuit elements, the generation component only changes positions of conductive circuit elements within the cell, and does not change the position of the altered cell within the second wiring layer.

With such alterations, the generation component automatically repeats the process of identifying violations, of offsetting the conductors of the second wiring layer, of repeatedly identifying violations for each of the offset positions, and the generating metrics to produce altered metrics (based on all violations identified for each of the offset positions).

Therefore, the first metric and the altered metrics are generated by the generation component automatically determining (for the original cell and for the alterations) whether a violation occurs at each position of the conductors of the second wiring layer; and calculating a number of violations of all positions of the conductors of the second wiring layer for the original cell, to produce the first metric, and separately for each of the alterations, to produce each of the altered metrics.

Also, the generation component automatically selects a selected design feature based on which cell produces the lowest number of violations of the design rules (highest number of non-violations or opens). Then, the manufacturing machines use masks within manufacturing equipment to produce wafers, and divide the wafers into the integrated circuit devices.

BRIEF DESCRIPTION OF THE DRAWINGS

The embodiments herein will be better understood from the following detailed description with reference to the drawings, which are not necessarily drawn to scale and in which:

FIGS. 2-9 are top-view conceptual schematic diagrams showing overlapping wiring layers of a multi-layer integrated circuit structure of embodiments herein;

DETAILED DESCRIPTION

Figure 1A:
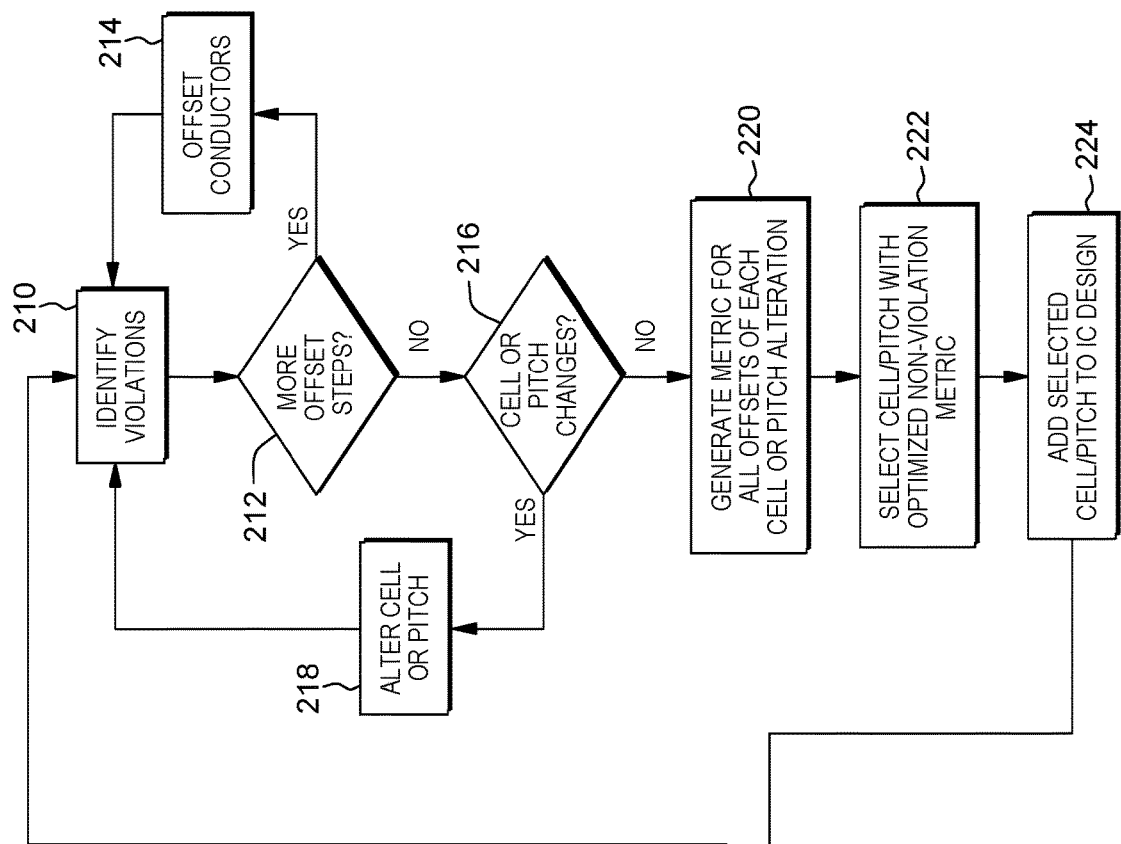
FIG. 1A-1C are flow diagrams illustrating embodiments herein.
Figure 1A:
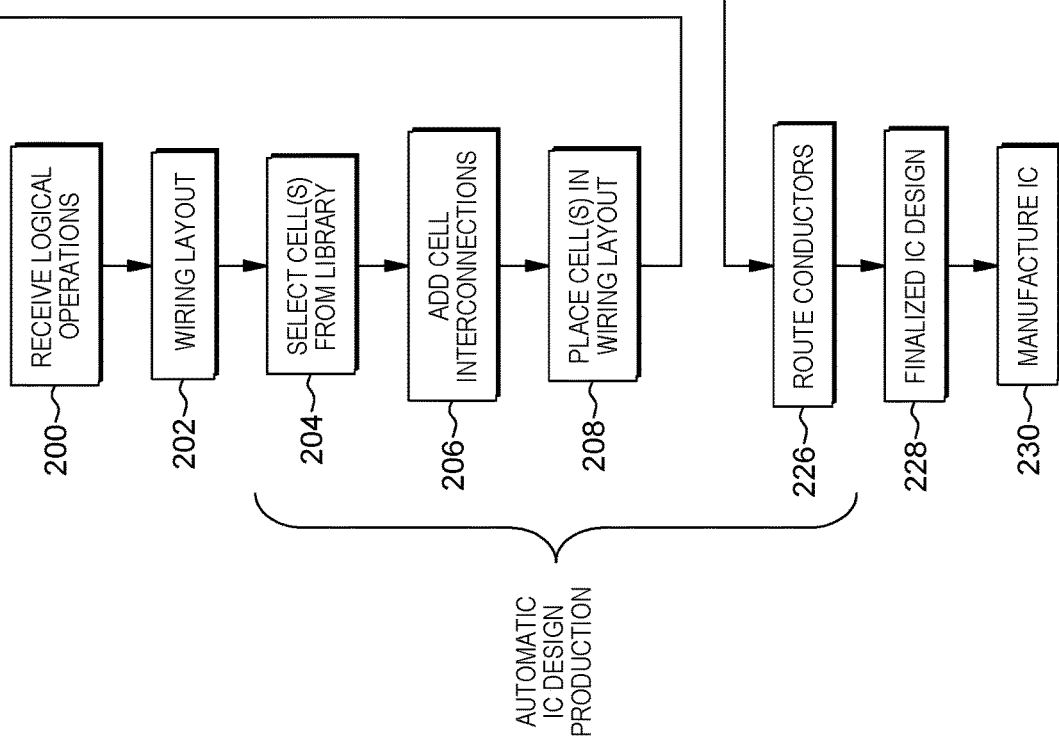

As mentioned above, sometimes during placement/routing, conductors that are designed to be insulated from one another can be placed too close to one another (possibly causing unexpected and undesirable short circuits), or conductors that are designed to contact one another may not overlap one another sufficiently to provide a reliable connection (possibly causing unexpected and undesirable open circuits). In a more specific example, standard cell libraries in technologies with unidirectional metal often share metal levels with a pre-defined periodic power distribution. The placement of metal in the cells can greatly limit flexibility as to where the cells are located in the grid, greatly reducing flexibility in placement of such cells.

In view of such technical problems associated with placement of devices and wiring when manufacturing integrated circuit devices, the systems and methods herein solve such technical challenges by determining and maximizing the fraction of possible placements which are legal for any designed cell when there is a periodic pre-defined power grid. Thus, the solutions presented herein change the physical design of integrated circuits to improve the performance, yield, durability, etc., of such computing devices, while reducing the cost, size, etc. of the integrated circuit computing devices. This is accomplished by overlaying the power grid over the cell, looking for any interference with wires within the cell, and stepping the conductors of the power grid through possible offsets with respect to the cell that could occur during placement, until the power grid periodicity has been met. These systems and methods also tabulate the fraction of the positions which were non-interfering, alter the cell wiring, and repeat such processes until the maximum number of locations have been achieved.

In greater detail, the systems and methods herein use standard cells that are designed with connections to different (perpendicularly oriented) metallization layers, such as the first and second metallization layers M0 and M1 (that are separated by an insulator layer), where the M1 conductors are generally spaced at a fixed pitch. There are generally multiple locations available for the M1 (track assignments). A desired M1 power grid is defined on the same pitch and track grid, with the pitch being driven by performance needs (electro migration (EM), voltage (IR) drop, etc.). There are possible locations for a cell that are set by the device periodicity, and such is used to determine the possible locations of the cell within the power grid. This also defines a finite list of possible offsets of the power grid with respect to each cell. Note that while specific wiring levels (e.g., M0, M1) are used in some examples herein, those ordinarily skilled in the art would understand that the concepts presented herein are applicable to any levels of IC devices that include wiring and/or logic cells, and the concepts herein are not limited to M0 and M1 wiring levels because such are only used in an arbitrary representative manner in the examples herein.

With processing herein, for each cell, the following loop processing is performed: for each grid offset, the grid is overlaid on the cell and the combined shapes are checked for legality (overlap or space violation). The fraction of locations that are allowed, and the relative location of each, is tabulated as a quality metric. The cell is modified to try to improve that metric, primarily by moving M1 to new locations where M0 connectivity allows. The entire library of cells can be measured in this way for a range of other power grid periodicities to assess the value of other power grids.

Therefore, this process of changing the positions of elements within the integrated circuit devices allows cells to be located in positions where there will be less conflicts with the space needed for wiring conductors. This, in turn, potentially allows less or shorter conductor wiring to be used, allows more wires and cells per unit area to be used, reduces the chances that short circuits will occur, etc., which alters the design of integrated circuit devices to increase yield, performance, speed, etc., of such computing devices.

As shown in flowchart form in FIG. 1A, in item 200 methods herein receive logical operations that are to be performed by a hardware component. For example, these logical operations can be from a designer and can be input into input components of a design interface component of systems herein. For example, these inputs can be supplied into a graphic user interface (GUI) of a computer aided design (CAD) application.

In item 202, these methods produce, select, or receive a wiring layout of a first wiring layer (M0, sometimes having irregularly spaced conductors) and a second wiring layer (M1, having regularly spaced conductors) of a multi-level integrated circuit design. The first wiring layer is separated from the second wiring layer by an insulator layer through which via connections connect elements of the first and second wiring layers. Again, the first wiring layer can sometimes have an irregular pattern of electrical conductors, and in contrast the second wiring layer has a regular pattern of parallel, aligned, equal length, regularly-spaced electrical conductors, separated by areas reserved for cells, which are generally perpendicular to the conductors of the first wiring layer.

Additionally, these methods automatically produce an integrated circuit (IC) design that accomplishes the logical operations supplied from the designer, using a generation component of such systems, as shown in item 204-208 and 226. To automatically produce the integrated circuit design, in item 204, these methods automatically select one or more cells of the integrated circuit design (from a library of previously designed and verified, standardized cells) that will perform the logical operations required by the designer. In item 206, the methods herein automatically determine (or define) interconnections that need to be made between the cells of the integrated circuit design so that such logical operation can be achieved by the integrated circuit device once produced. Then, as shown in item 208, such methods place (physically position) one or more cells (e.g., an "original" cell having conductive circuit elements) within the second wiring layer to align with connections through the insulator layer to the first wiring layer.

Next, as shown in item 210, the methods herein identify violations of whether any of the conductive circuit elements of the original cell violate design rules (e.g., spacing or overlap violations) with respect to the conductors of the second wiring layer (while the conductors of the second wiring layer are in an original, non-offset, or "first" position). Such methods offset the conductors of the second wiring layer from the original position (without moving the original cell in the second wiring layer) as shown in item 214, and repeat the process of identifying violations with the conductors of the second wiring layer offset, in item 210.

In greater detail, the offsetting process 214 offsets the conductors of the second wiring layer into all possible offset positions the conductors of the second wiring layer are capable of being moved, as restricted by design constraints. For example, it is common for the regularly-spaced pattern of conductors of the second wiring layer to be offset (e.g., shifted or moved in a direction perpendicular to alignment of the parallel, regularly-spaced conductors of the second wiring layer). The conductors of the second wiring layer are offset together in regular steps during routing, or other similar operations, in order to make the integrated circuit device ultimately produced more effective (e.g., to make the integrated circuit device consume less power, operate faster, be smaller, more reliably form all desired power connections, reduce the likelihood of short circuits or other defects, etc.). Such "steps" are limited by the spacing between conductors of the second wiring layer. Therefore, as shown in decision box 212, before offsetting, the processing flow first checks to see if any offset positions remain (if there are any more offset positions to which the offsetting process has not yet stepped). Therefore, if violations for all possible offset positions have not yet been identified in item 210, as determined at decision box 212, the methods herein offset the conductors 214 and repeat the process of identifying violations 210 with the conductors of the second wiring layer offset from the previous position, and continues to loop through items 210-214 (performing what is sometimes referred to herein as a "porosity analysis" as long as offsets can be made to identify violations for all possible offset positions).

Once violations for all possible offset positions have been identified in item 210, as determined at decision box 212, these methods allow the designer to make internal changes to the cell, or changes to the pitch of the conductors of the second wiring layer in decision box 216, where cell or pitch alterations are made in item 218. Thus, in item 218, as one option the spacing between the conductors of the second wiring layer can be changed (manually or automatically) to change the power grid pitch. The pitch can be changed in increments consistent with manufacturing abilities, which can also provide minimum and maximum pitches that can be manufactured effectively.

As an alternative, changes to the cell in item 218 can be made (manually or automatically) and such changes alter the positions of some conductive circuit elements within (internal to) the original cell 218, and this produces one or more (and possibly a series of) alterations as processing loops through items 210-218. Theses alterations made in item 218 cause the original cell to maintain the same functionality, size, and alignment to the connections to the first wiring layer relative to the original cell. Instead of changing cell functionality, size, location, or first wiring layer connections, such cell alterations 218 only change positions of some internal conductive circuit elements within the cell. Thus, these alterations do not change the position of the cell within the second wiring layer from the position of the original cell, and do not change connections to the first wiring layer.

Then, as shown by the arrow in FIG. 1A, processing flows from item 218 back to item 210 for each of such altered pitches or alterations, where these methods repeat the process of identifying violations 210, the process of offsetting the conductors of the second wiring layer 212-214, and the process of repeatedly identifying violations for each offset position of the conductors of the second wiring layer (nested loop 210-214). Only one type of change is made in item 218 (internal cell change or conductor pitch change) through each loop of items 210-218 to allow the nested loop (loop 210-214) to evaluate a single cell or pitch alteration at a time. By evaluating a single change at a time (either one cell change or one pitch change) the change in violations caused by that single change can be evaluated more accurately, by stepping through all offset steps (loop 210-214) with that single change.

In one example, the original cell (unaltered from the library) can be evaluated at each offset step (nested loop 210-214) through a series of pitch changes (loop 210-218); then a change can be made to the original cell to create a first altered cell in item 218, and the first altered cell can be evaluated at each offset step (loop 210-214) through the same series of pitch changes (loop 210-218); then a change can be made to the first altered cell to create a second altered cell in item 218, and the second altered cell can be evaluated at each offset step (loop 210-214) through the same series of pitch changes (loop 210-218); etc. In other examples, a series of cell changes can be individually evaluated through different offset steps at a specific pitch, the pitch can then be changed, and the same series of cell changes can then be evaluated individually evaluated through different offset steps at the next pitch. In some examples, only pitch changes are evaluated, in others only cell changes are evaluated. Combinations of cell change and pitch can be evaluated using different change combinations where, again, only a single change at a time (either one cell change or one pitch change) is made before all offsets are evaluated for violations (nested loop 210-214) for that single change.

Further, such "single" changes to the cell made in item 218 can change the position, size, shape, etc., of multiple conductive elements within the cell. Therefore, while each single internal cell change in item 218 can be to a single (e.g., size) change to a single internal conductive element, such a single internal cell change in item 218 can be a combined size, position, shape change to one or multiple internal conductive elements of the cell, or the result of a series of cumulative changes. In one example, if the position of an internal conductive element is moved within a cell, the wiring to that element is also moved to allow the contact on the perimeter of the cell to remain in the same location; however, while multiple internal components are changed, such a change is still conceptually a single change for purposes herein. Such alteration in item 218 is considered a single change herein because such is the change from the previous version of the cell to the current, most recent, altered version of the cell.

Once there are no more cell or pitch changes to be made in item 216, processing flows to item 220 where these methods generate a first metric for the original cell based on all the violations that were identified (during the initial process of identifying violations and the repeated processes of identifying violations for all offsets) for the original position and each of the different offset positions of the conductors of the second wiring layer, and similarly generate metrics for each altered functional cell or different pitch, based on all the violations that were identified for that altered functional cell or different pitch, for each of the different offset positions.

In greater detail, the first metric and the altered metrics are generated in item 220 by determining (for the original cell and for the alterations) whether a violation occurs at each position (the original position and each offset) of the conductors of the second wiring layer; and calculating a number of violations of all positions of the conductors of the second wiring layer. This is done for the original cell, to produce the first metric; and separately for each of the altered cells and for each of the pitches, to produce each of the altered metrics.

Once this is finished for the original cell and all the alterations, such methods select the single cell and/or single pitch that produces the optimized violation metric as a selected cell and/or pitch in item 222. With this, these methods then place the selected cell and/or pitch in the integrated circuit design in item 224.

Such methods then route connections between cells of the integrated circuit design and these methods route power connections from the second wiring layer to the selected cell, as shown in item 226; and this produces a finalized integrated circuit design 228. Then, integrated circuit devices are manufactured following the finalized integrated circuit design in item 230. More specifically, in some of the processing in item 230, masks are generated from the finalized integrated circuit design. In item 230, these masks are used within manufacturing equipment to produce wafers. The wafers are subsequently divided into integrated circuit devices as fully functional manufactured devices in item 230. Further, such fully functional manufactured devices can be packaged, and/or used in products that are sold/shipped to final customers.

Figure 1C:
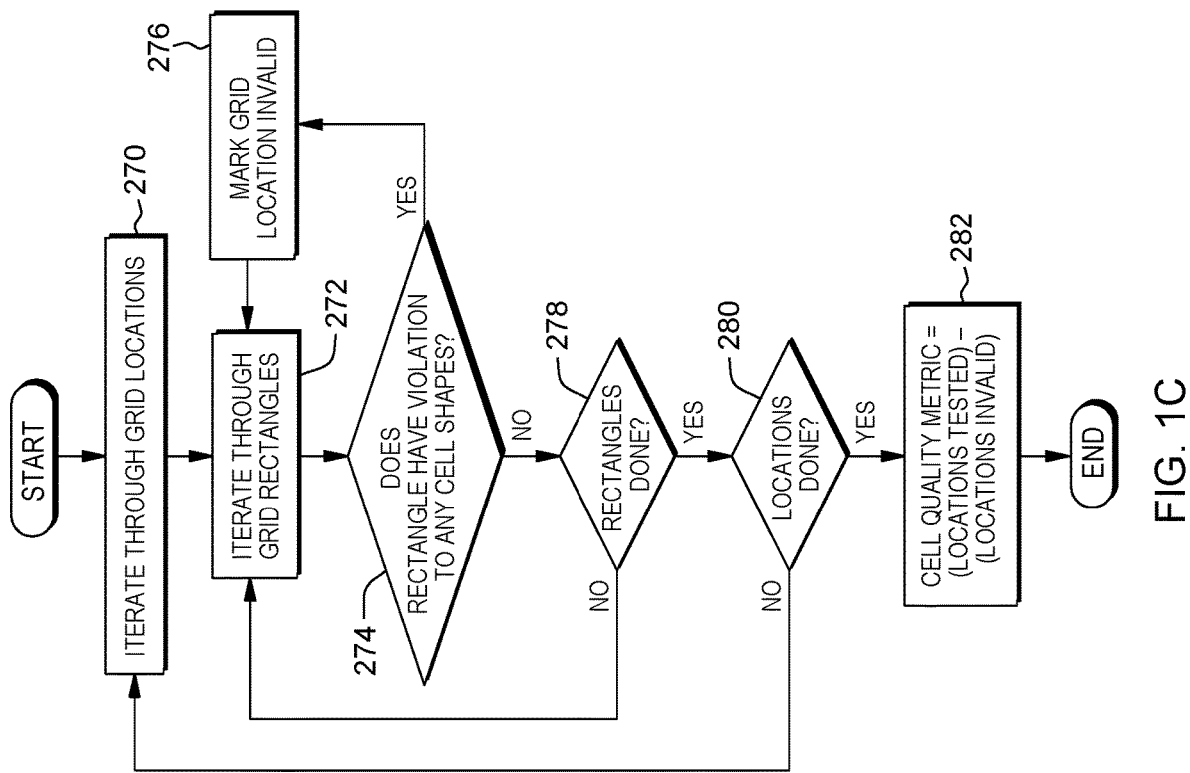
Figure 1B:
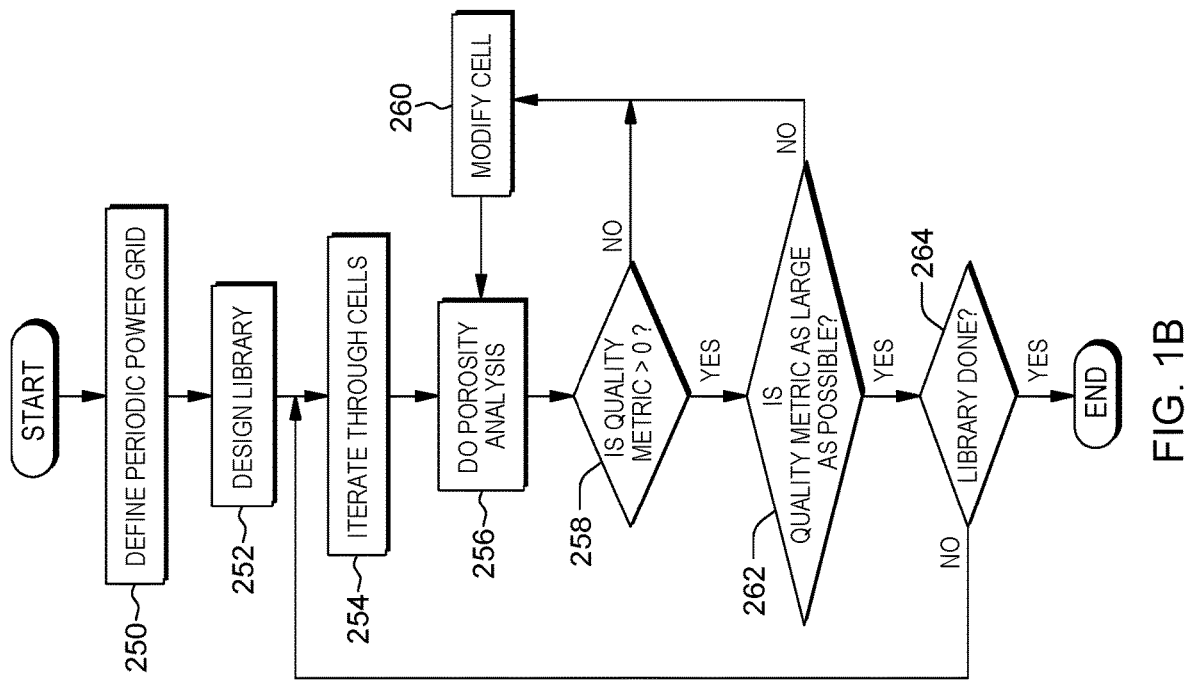
Figure 2:
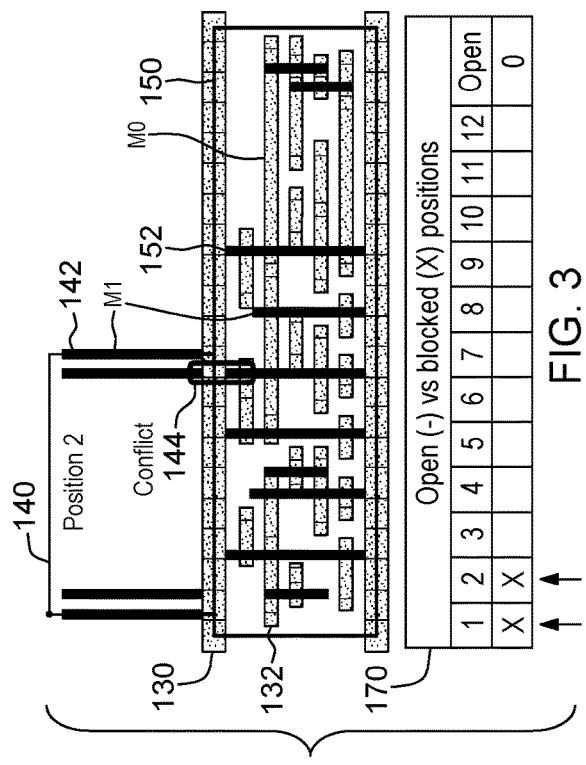

FIG. 1B is a flowchart that shows a library optimization that is performed by methods and systems herein. More specifically, in item 250 the details of the periodic power grid in the M1 layer are defined/established, including the length, width, spacing, etc., of the conductors. A specific design library that will be optimized is selected, accessed, or created, etc., in item 252.

Beginning at item 254 the processing iterates through each of the cells (individual previously created standardized logical circuits) within the library. During each such iteration, this processing performs the aforementioned porosity analysis (loop of items 210-214 through all offsets) in item 256. Decision box 258 checks to see whether any of the offsets produce an open (non-violation) condition (quality metric>0); and if so, processing proceeds to item 262. However, if even after looping through all offsets, there are no open offset positions (quality metric=0) then processing immediately loops back to item 260 to modify the cell (because when there are no open offset positions, no offset will allow that cell to be placed, violation-free, within the power grid defined in item 250). After modifying the cell, the porosity analysis 256 is again repeated.

In item 262, the decision box checks to find if the quality metric is as large as possible (compared to a known quality metric goal, or compared to other iterations of items 256-262); and, if not, again the cell is modified in item 260, and the porosity analysis 256 is again repeated. If the quality metric is as large as possible in item 262, the flow proceeds to item 264 which determines whether additional cells are left to be evaluated in the library; and if not processing ends, but if so the flow returns to item 254 to analyze the next cell in the library.

FIG. 1C is a flow that shows the porosity analysis (initially shown in items 210-214 in FIG. 1A, and item 256 in FIG. 1B) in greater detail. More specifically, item 270 begins the process of iterating through the all offset steps of the positions of the conductors of the second wiring layer (loop 270-280). Item 272 begins nested iterations of processing for possible violations through grid rectangles (nested loop 272-278). In the nested loop, item 274 looks to whether each grid rectangle (conductors within M1) has a violation to any cell shapes (conductive internal cell elements); and, if so, the grid location is marked as being invalid (as having a spacing or overlap violation) in item 276. In contrast, if the grid rectangle does not have any violations to any cell shapes in item 274, decision box 278 looks to see if there are any remaining rectangles are to be iterated through; and, if so the flow proceeds back to item 272 to process the next rectangle, but if not processing proceeds to item 280. Decision box 280 looks to see if there are any remaining grid locations that are to be iterated through; and, if so the flow proceeds back to item 270 to process the next grid location (the next grid offset), but if not processing proceeds to item 282. Item 282 calculates the cell quality metric which is equal to the number of locations tested (original grid location plus all offsets) less the number of locations that are invalid (e.g., cell quality metric= (locations tested)–(locations invalid)) after which processing ends.

FIGS. 2-8 illustrate such processing by showing the above-operations with an example provided in a top (plan) conceptual view. FIGS. 2-8 show a second wiring layer (M1) 140 having parallel, aligned, equal length, regularly-spaced electrical conductors 142 overlaid on a first wiring layer (M0) 130 that may have a regular or irregular pattern of electrical conductors 132, which are generally perpendicular to the conductors 142 of the second wiring layer 140. A cell 150 is placed in an area of the second wiring layer 140 that does not include any of the regularly-spaced electrical conductors 142 (an area designated for cells), and the cell 150 also includes conductive elements 152 (which can run parallel to the conductors of the second wiring layer 140). The conductive elements 152 are in the same plane as the regularly-spaced electrical conductors 142, and therefore both receive the label M1 in the drawings.

Figures 10, 11:
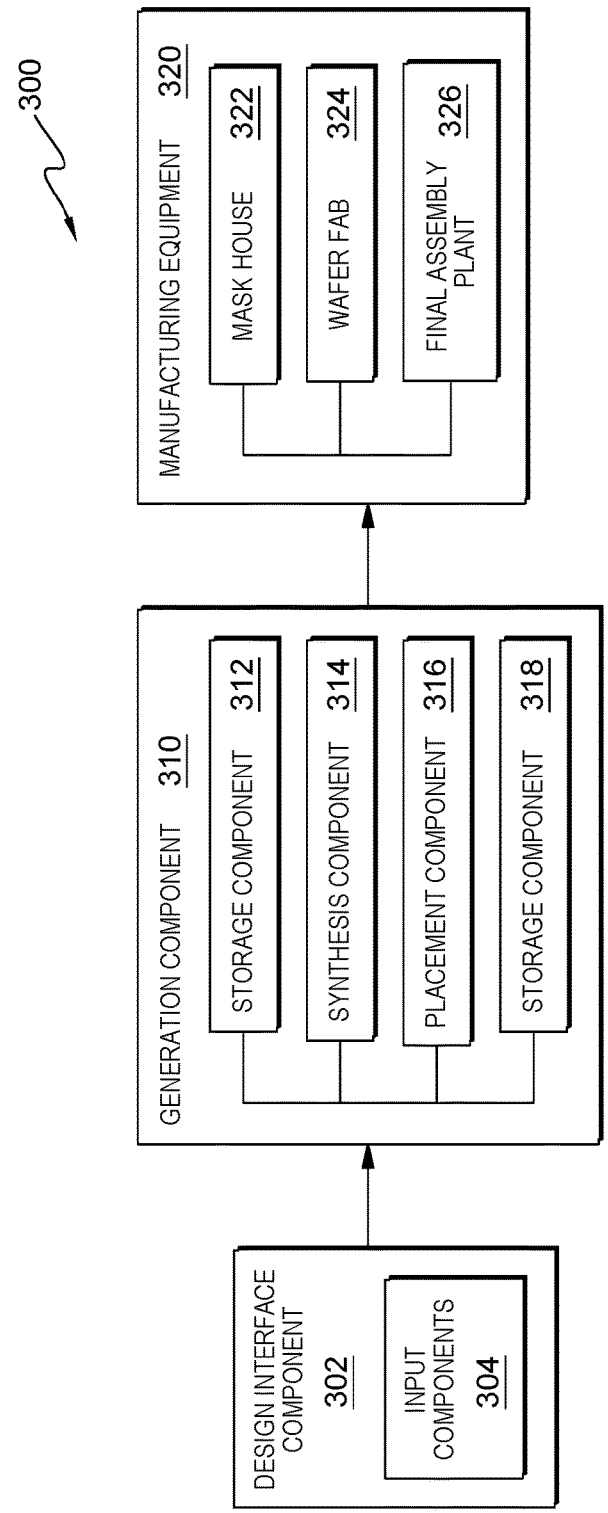
FIG. 10 is an array recording numbers of open locations for different wiring pitches produced by embodiments herein.
FIG. 11 is a conceptual schematic diagram of hardware systems according to embodiments herein.

The conductive elements 152 are electrically connected to the conductors 132 of the first wiring layer 130 by conductive vias that extend through an intervening insulator layer, which is between the first wiring layer 130 and the second wiring layer 140 (and such vias are shown in FIG. 11, discussed below). FIGS. 2-8 also illustrate a spacing violation 144 between conductive elements 152 of the cell 150 and the regularly-spaced electrical conductors 142 of the second wiring layer 140. In FIGS. 2-8 the position of the regularly-spaced electrical conductors 142 are offset to illustrate different violations 144 that can occur. Item 170 is an array (chart) that uses an "X" to indicate whether there are any violations 144 that occur in each of the offset positions in FIGS. 2-8 (where a blank or dash "-" is used to indicate no violations in array 170).

Figure 3:
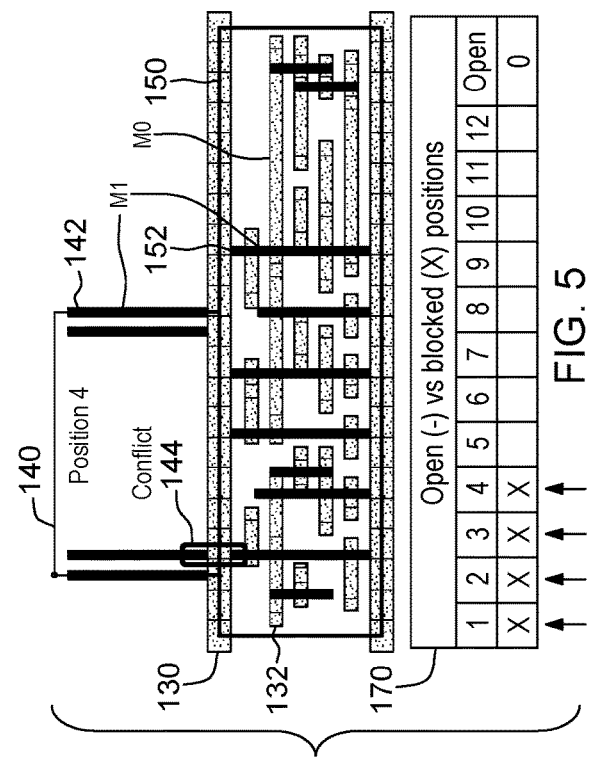

As noted above, the methods herein identify violations 144 of whether any of the conductive circuit element of the original cell 150 violate design rules (e.g., spacing or overlap violations 144) with respect to the conductors 142 of the second wiring layer 140. The conductors 142 of the second wiring layer 140 are in an original, non-offset, or (arbitrarily designated) "first" position in FIG. 2. As shown in FIG. 3, such methods offset the conductors 142 of the second wiring layer 140 from the first position 1 (without moving the original cell 150 in the second wiring layer 140) to an offset position 2. As shown in FIG. 3, these methods repeat the process of identifying violations 144 with the conductors 142 of the second wiring layer 140 offset to position 2. Note that this is also recorded in the array 170 in FIG. 3 where both position 1 and 2 have an X stored.

Figure 4:
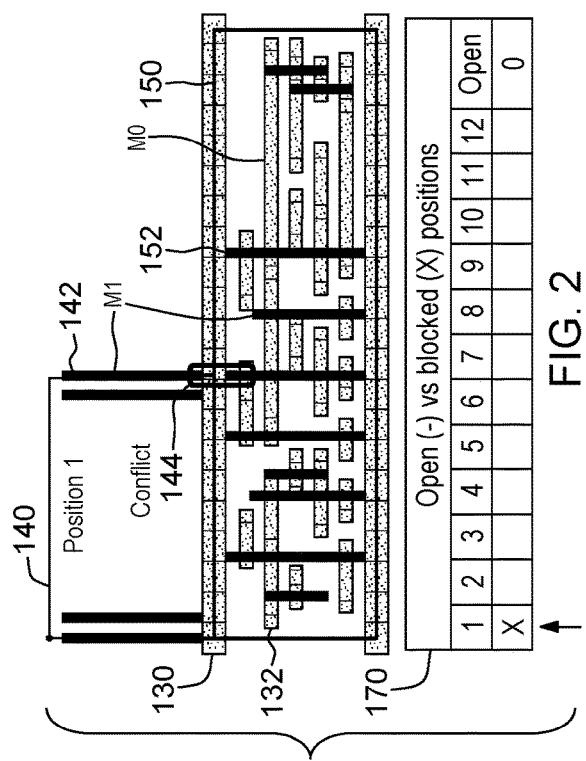
Figure 5:
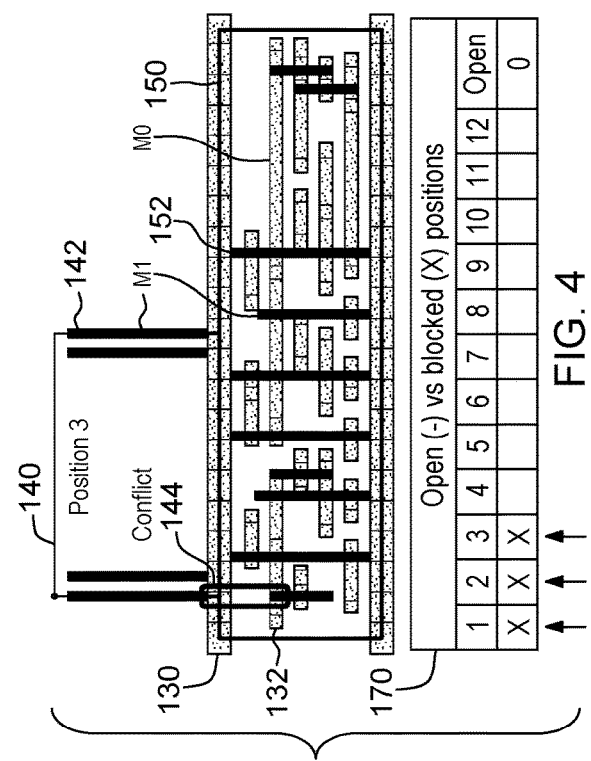

As shown in FIGS. 3-8, the offsetting process offsets the conductors 142 of the second wiring layer 140 into all possible offset positions the conductors 142 of the second wiring layer 140 are capable of being moved, as restricted by design constraints (here positions 1-12 as indicated by highest position in array 170). Specifically, FIG. 4 illustrates that when the conductors 142 of the second wiring layer 140 are offset an additional step to position 3, there is also at least one spacing violation, and the same is recorded with an X in array 170. FIG. 5 illustrates that when the conductors 142 of the second wiring layer 140 are offset an additional step to position 4, there is also at least one spacing violation, and again the same is recorded with an X in array 170. Similarly, FIG. 6 illustrates that when the conductors 142 of the second wiring layer 140 are offset an additional step to position 5, there is similarly at least one spacing violation, and the same is recorded with an X in array 170. In contrast, in FIG. 7 when the conductors 142 of the second wiring layer 140 are offset an additional step to position 6, there are not any spacing violations, and that is recorded with a dash ("-") in array 170. Such processes are repeated until the last position (position 12) is reached, where as shown in FIG. 8, there are also no spacing violations, and the same is recorded with a dash ("-") in array 170.

Note that through each offset step of the conductors 142 of the second wiring layer 140, each time there is at least one violation 144 (or lack of violations) the same is recorded in array 170. The array 170 in FIG. 8 shows the result of all 11 steps (plus the original position). As can be seen in array 170 in FIG. 8, violations occurred at positions 1-5 and 7-11, with no violations occurring at positions 6 and 12. Therefore, in this example, of the 12 total positions, there are two non-violations (2 open) and 10 violations (10 blocked) providing a metric ratio of 2 (e.g., 12−10=2).

Again, it is common for the regularly-spaced pattern of conductors 142 of the second wiring layer 140 to be offset (e.g., shifted or moved in a direction perpendicular to alignment of the parallel, regularly-spaced conductors 142 of the second wiring layer 140) together in regular steps during routing, or other similar operations, in order to make the integrated circuit device ultimately produced more effective (e.g., to make the integrated circuit device consume less power, operate faster, be smaller, more reliably form all desired power connections, reduce the likelihood of short circuits or other defects, etc.). Such "steps" are limited by the spacing between conductors 142 of the second wiring layer 140, and in the above-example are limited to 11 steps from the first position, for 12 total positions. Therefore, the methods herein offset the conductors and repeat the process of identifying violations 144 with the conductors 142 of the second wiring layer 140 offset from the previous position, and continues to loop through such processing as long as offsets can be made to identify violations 144 for all possible positions 1-12.

Once violations 144 for all possible offset positions 1-12 have been identified, as determined, these methods allow the designer to make changes to the pitch of the conductors 142 of the second wiring layer 140, or internal changes to the cell 150. In the example shown in FIG. 9, one internal cell change that can be made is to the length of some of the conductive elements 152. Specifically, in FIG. 9, conductive elements 152 are shortened to move such conductive elements away from the conductors 142 of the second wiring layer 140. Such change to the now altered cell 154 can be made manually or automatically, and such change alters the positions, sizes, shapes, etc., of conductive circuit elements 152 within (internal to) the altered cell 154. As shown in FIG. 9, this produces one or more (possibly a series of) altered functional cell 154 as processing loops through different internal cell changes. The alterations may cause the altered cell 154 to maintain the same functionality, size, and alignment to the connections to the first wiring layer 130 relative to the original cell 150. Thus, as shown in FIG. 9, instead of changing the altered cell 154 functionality, size, location, or first wiring layer 130 connections, such alterations only change positions, sizes, shapes, etc., of one or more internal conductive circuit elements 152 within the altered cell 154. Thus, these internal cell alterations do not change the position of the altered cell 154 within the second wiring layer 140 from the position of the original cell 150, and do not change connections to the first wiring layer 130.

As noted above, as an alternative to (or in addition to) internal cell changes, processing herein can change the pitch of the conductors of the second wiring layer. FIG. 10 is an array that illustrates the number of open positions (non-violations) resulting from stepping through all second wiring layer conductor offsets for different cells (cells 1-7) using different pitches for the conductors of the second wiring layer (pitches 8-20). The different cells 1-7 can be alterations of the same cell, or can be different library cells having different logical functions.

Thus, as shown in FIG. 10, for Cell 1 (top data row in the array), when the pitch of the conductors of the second wiring layer is 8, all offsets of the second wiring layer conductors results in a violation, which results in 0 open positions for Cell 1 in the column under the 8 pitch. In contrast, when the pitch is changed to 12 for Cell 1, 3 of the offsets of the second wiring layer conductors results in a non-violation, and the array in FIG. 10 shows 3 in the column under the 12 pitch. With reference back to FIG. 1A, the array shown in FIG. 10 is created by looping through items 210-214 for Cell 1 with an 8 pitch; then, in item 218, the pitch is changed to 9 and again items 210-214 are looped for Cell 1 with a 9 pitch; then, in item 218, the pitch is changed to 10 and again items 210-214 are looped for Cell 1 with a 9 pitch; etc. Thus, items 210-214 are looped through for each individual pitch from 8 to 20 for Cell 1. Then, item 218, Cell 2 is substituted for Cell 1, and items 210-214 are looped through, first with the 8 pitch, then with a 9 pitch, 10 pitch, 11 pitch, etc. To create the second data row for Cell 2 within the array shown in FIG. 10. The remaining cells are similarly individually looped through items 210-214 for each different pitch, thereby producing the full array shown in FIG. 10.

As can be seen in the array shown in FIG. 10, the pitch of 12 produces the greatest number of opens (non-violations) in each of the different cells 1-7. However, other performance criteria (electro migration (EM), voltage (IR) drop, etc.) mandate that the pitch should be as low as possible (e.g., be below a maximum pitch, or within a pitch range) resulting in a different column (such as pitch 12) being the optimum pitch. Thus, this permits methods herein to select a design feature based on which cell produces the lowest number of violations of the design rules (highest number of non-violations or opens), within a maximum pitch limit or within a pitch range.

In view of this, if a design uses Cells 1-7, the 12 grid pitch for the power grid of the conductors within the second wiring layer would be the optimized pitch. Those ordinarily skilled in the art would understand that the selection of different cells would produce different data within the array. This allows the processing herein to analyze each different integrated circuit design by placing all (or at least the most common) library cells that will be included within the integrated circuit design in the array shown in FIG. 10 to identify the power grid pitch that will produce the optimized amount of design rule violations when such cells are placed and routing is performed.

FIG. 11 is a conceptual schematic diagram that illustrates systems 300 herein that include a design interface component 302 that includes input components 304 that receive logical operations that are to be performed by a hardware component from a designer. A generation component 310 is included that automatically produces an integrated circuit design that accomplishes the logical operations supplied from the designer. Further, manufacturing machines 322 are components that produce integrated circuits according to the integrated circuit design.

In greater detail, as shown in FIG. 11, the generation component 310 includes a storage component 312 that maintains a library of cells. Additionally, the generation component 310 includes a synthesis component 314 that automatically selects cells of the integrated circuit design from the library of cells to perform the logical operations from received the designer. The generation component 310 additionally automatically determines interconnections between the cells of the integrated circuit design. The generation component 310 also has a placement component 316 that automatically places the cells of the integrated circuit design within the second wiring layer of a multi-level integrated circuit design. Again, the second wiring layer is separated from a first wiring layer by an insulator layer in the multi-level integrated circuit design, and the first wiring layer that can sometimes have an irregular pattern of electrical conductors, but the second wiring layer has a regular pattern of electrical conductors separated by areas reserved for cells.

A routing component 318 is included as part of the generation component 310, and the routing component 318 automatically routes conductors forming the interconnections, including interconnections between the cells of the integrated circuit design and connections between the cells of the integrated circuit design and power supplies in the second wiring layer.

In greater detail, the placement component 316 automatically positions an original cell that has conductive circuit elements within the second wiring layer to align with connections through the insulator layer to the first wiring layer. Then, the generation component 310 automatically identifies violations of whether any of the conductive circuit elements of the original cell violate design rules with respect to the conductors of the second wiring layer (while the conductors of the second wiring layer are in an original position).

After this, the generation component 310 automatically offsets the conductors of the second wiring layer from the original position into different offset positions (into all offset positions the conductors of the second wiring layer are capable of being moved as restricted by design constraints). Then, the generation component 310 can automatically repeat the process of identifying violations for each of the offset positions (without moving the original cell in the second wiring layer). This allows the generation component 310 to automatically generate a first metric for the original cell, based on all violations identified for the original position and each of the offset positions.

Following this, the generation component 310 automatically alters the position, size, shape, etc., of internal conductive components of the original cell (while still allowing the altered cell to maintain the same functionality and alignment to the connections to the first wiring layer as the original cell) or alters the pitch of the second wiring layer to produce alterations. When altering the positions of the conductive circuit elements, the generation component 310 only changes positions of conductive circuit elements within the altered cell, and does not change position of the altered cell within the second wiring layer.

With such alterations, the generation component 310 automatically repeats the process of identifying violations, of offsetting the conductors of the second wiring layer, the process of repeatedly identifying violations for each of the offset positions, and the generating of metrics to produce altered metrics (based on all violations identified for each of the offset positions).

Therefore, the first metric and the altered metrics are generated by the generation component 310 automatically determining (for the original cell and for the alterations) whether a violation occurs at each position of the conductors of the second wiring layer; and calculating a number of violations of all positions of the conductors of the second wiring layer for the original cell, to produce the first metric, and separately for each of the alterations, to produce each of the altered metrics.

Also, the generation component 310 automatically selects a design feature (e.g., a selected cell for use in the design) based on which cell produces the lowest number of violations of the design rules (highest number of non-violations or opens), within a maximum pitch limit or within a pitch range. Then, integrated circuit devices are manufactured following the finalized integrated circuit design using manufacturing equipment 320. More specifically, masks can be generated from the finalized integrated circuit design by a mask house 322. Such masks can be used within wafer fabrication equipment 324 to produce wafers. The wafers are subsequently divided into integrated circuit devices (e.g., wafers are diced into dies or chips) as fully functional manufactured devices. Further, such fully functional manufactured devices can be packaged, and/or used in products that are sold/shipped to final customers in a final assembly facility 326.

Figure 12:
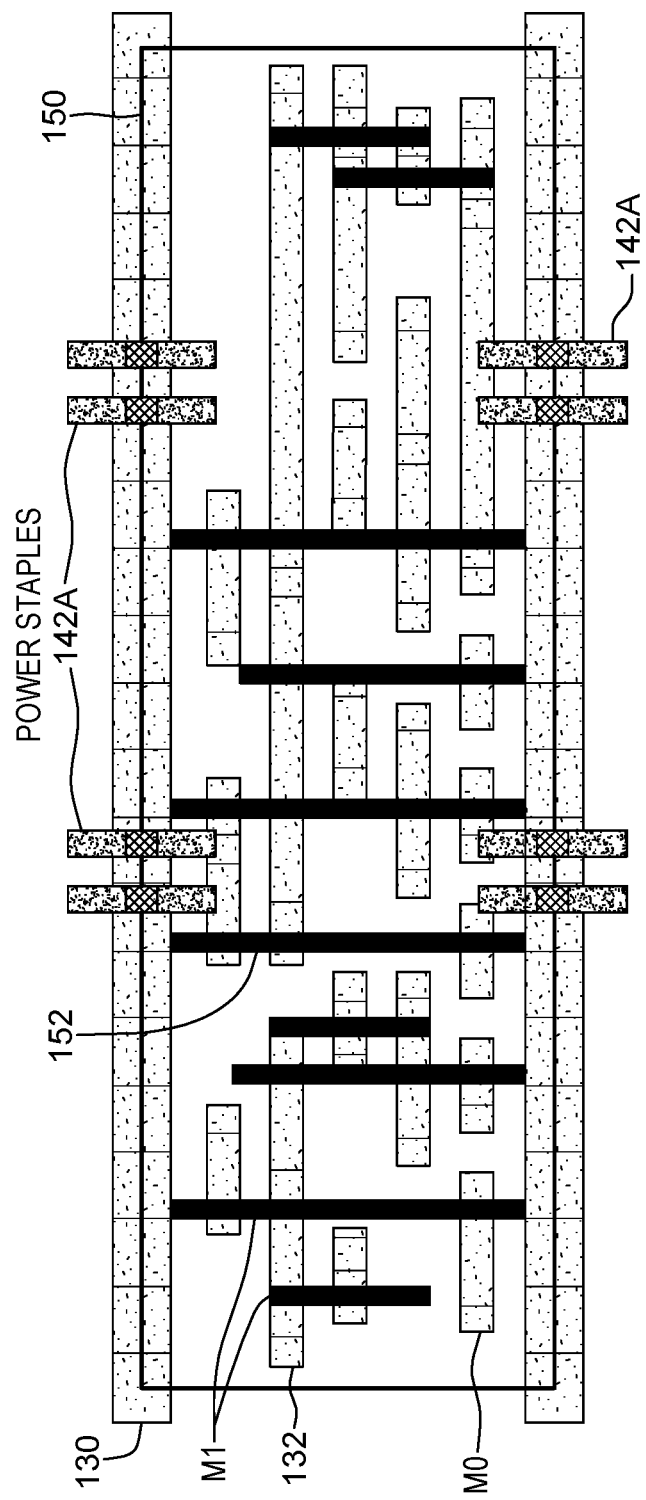
FIGS. 12 and 13 are top-view conceptual schematic diagrams showing overlapping wiring layers of a multi-layer integrated circuit structure of embodiments herein.
Figure 13:
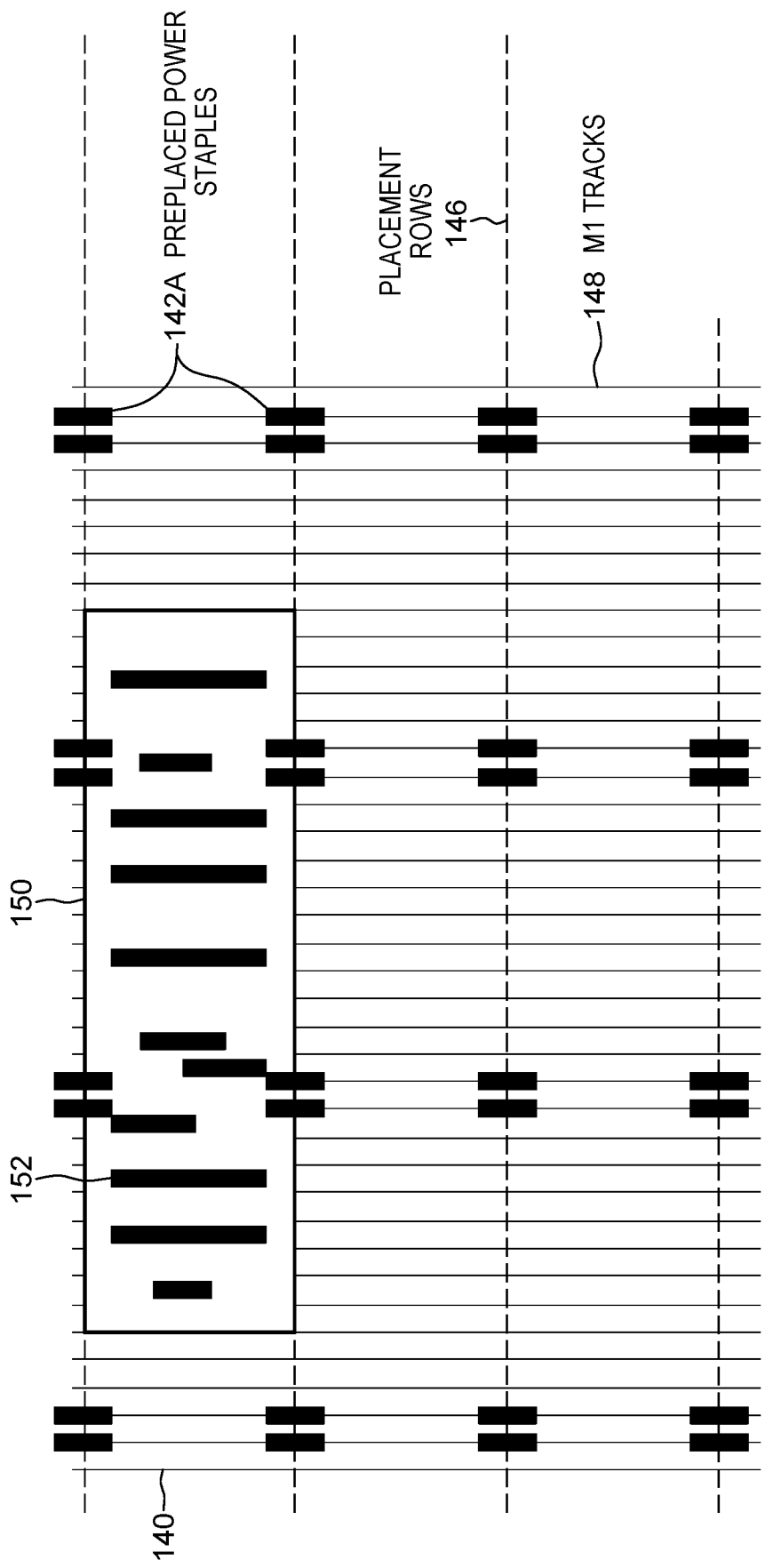

FIG. 12 is a similar view as that shown in FIGS. 2-9; however, FIG. 12 illustrates that the conductors 142 of the second wiring layer 140 can be power staples 142A. Similarly, FIG. 13 shows a top view conceptual diagram of the cell 150 within the second wiring layer 140, and illustrates that the cell 150 can be positioned among the regularly spaced power staples (conductors) 142A that are aligned in placement rows 146. FIG. 13 also shows the M1 tracks 148, which are the steps upon which the power staples (conductors) 142A can be offset.

Figure 14:
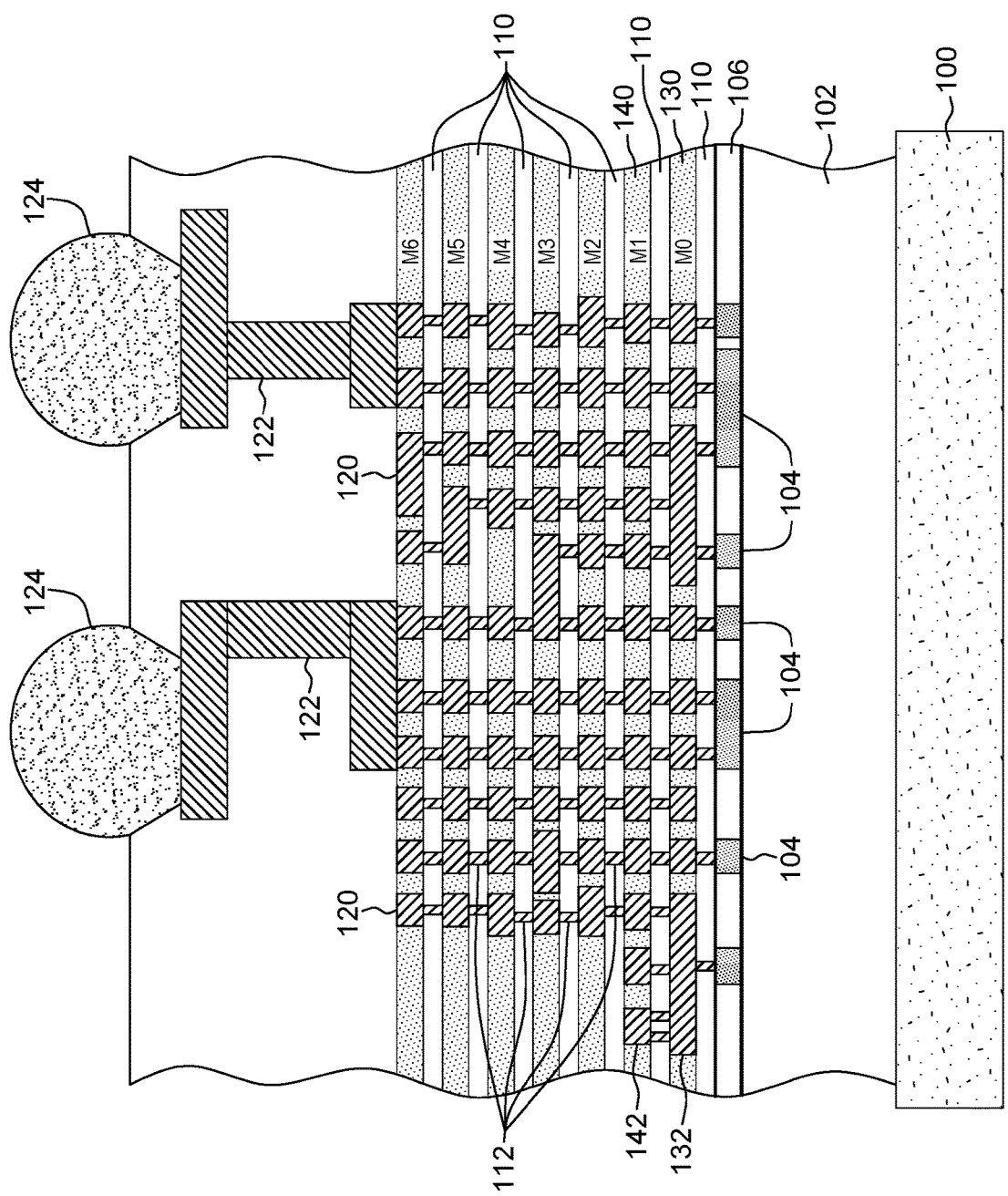
FIG. 14 is a cross-sectional view conceptual schematic diagram of the multi-layer integrated circuit structure according to embodiments herein shown in FIGS. 2-9 and 12-13.

FIG. 14 shows a portion of an integrated circuit device that can include the first wiring layer 130 and the second wiring layer 140 shown in FIGS. 2-9, discussed above. More specifically, FIG. 14 is a conceptual schematic cross-sectional diagram (that is viewed rotated perpendicular to the top views shown in FIGS. 2-9 and 12-13) and includes a substrate 100 and an insulator layer 102 thereon. A device layer 106 on the insulator layer 102 includes many integrated circuit devices including transistors, capacitors, diodes, etc. 104. Alternating inter-layer dielectric (ILD) layers 110 and wiring layers (metallization layers M0-M6) are positioned on the device layer 106. Wiring 120, 132, 142 is connected to the devices 104 in the device layer 106 by conductive vias 112 that extend through the various ILD layers 110. The distal (top) wiring layer (M6 in this example) connect to conductors 122 and eventually to solder balls 124 to allow external devices to communicate with the integrated circuit devices 104 within the device layer 106 through the various wiring layers M0-M6 (through the vias 112).

Figure 15:
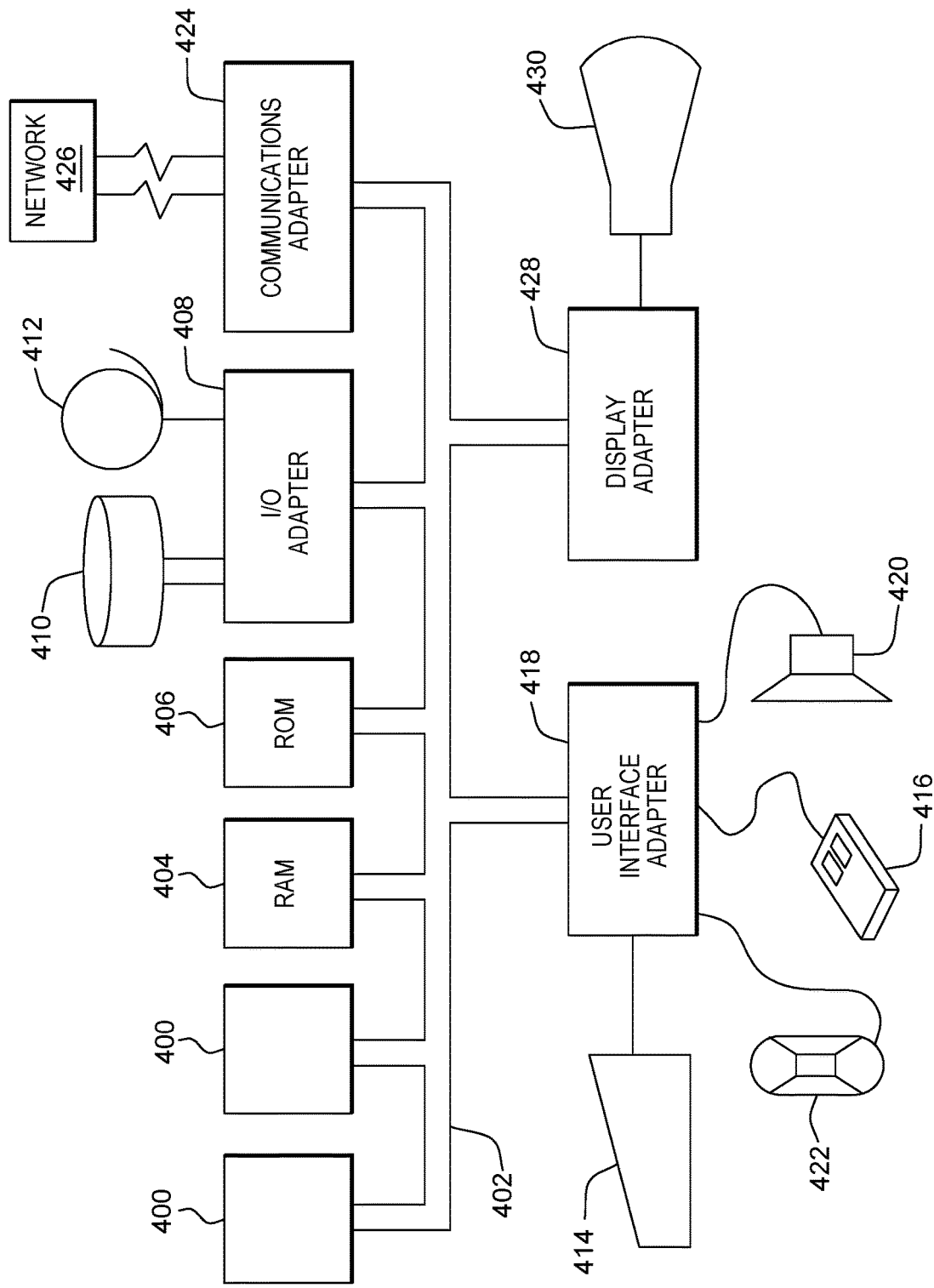
FIG. 15 is a conceptual schematic diagram of hardware systems according to embodiments herein.

A representative hardware environment (i.e., a computer system) for implementing the systems, methods and computer program products disclosed above is depicted in FIG. 15. This schematic drawing illustrates a hardware configuration of an information handling/computer system in accordance with the embodiments herein. The system incorporates at least one processor or central processing unit (CPU) 400. The CPUs 400 are interconnected via a system bus 402 to various devices such as a random access memory (RAM) 404, read-only memory (ROM) 406, and an input/output (I/O) adapter 408. The I/O adapter 408 can connect to peripheral devices, such as disk units 410 and tape drives 412, or other program storage devices that are readable by the system. The system can read the inventive instructions on the program storage devices and follow these instructions to execute the methodology of the embodiments herein. The system further includes a user interface adapter 418 that connects a keyboard 414, mouse 416, speaker 420, microphone 422, and/or other user interface devices such as a touch screen device (not shown) to the bus 402 to gather user input. Additionally, a communication adapter 424 connects the bus 402 to a data processing network 426, and a display adapter 428 connects the bus 402 to a display device 430 which may be embodied as an output device such as a monitor, printer, or transmitter, for example.

The flowchart and block diagrams in the figures illustrate the architecture, functionality, and operation of possible implementations of devices and methods according to various embodiments. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the foregoing. As used herein, the singular forms "a," "an," and "the" are intended to include the plural forms as well, unless the context clearly indicates otherwise. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements).

Each respective figure, in addition to illustrating methods of and functionality of the present embodiments at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method described above. In other words, one or more computer hardware devices can be created that are configured to implement the method and processes described herein with reference to the figures and their corresponding descriptions.

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments herein. The embodiments were chosen and described in order to best explain the principles of such, and the practical application, and to enable others of ordinary skill in the art to understand the various embodiments with various modifications as are suited to the particular use contemplated.

While the foregoing has been described in detail in connection with only a limited number of embodiments, it should be readily understood that the embodiments herein are not limited to such disclosure. Rather, the elements herein can be modified to incorporate any number of variations, alterations, substitutions or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. A method comprising:

positioning an original cell within a second wiring layer to align with connections through an insulator layer to a first wiring layer;

identifying violations occurring when the original cell violates design rules relative to conductors of the second wiring layer, while the conductors are in an original position, wherein the original cell comprises an irregular pattern of conductive circuit elements, and wherein the conductors are in a regular pattern in the second wiring layer separated by areas in the second wiring layer reserved for cells including the original cell;

offsetting the conductors of the second wiring layer into different offset positions;

repeating the identifying violations for each of the offset positions;

generating a first metric for the original cell based on all violations identified for the different offset positions; and altering the original cell or the second wiring layer to produce alterations;

for each of the alterations, repeating the identifying violations, the offsetting, the repeating the identifying violations for each of the offset positions, and the generating, to produce altered metrics for each of the alterations; and selecting the original cell or one of the alterations as a selected design feature based on the selected design feature producing a lowest number of violations of the design rules.

2. The method according to claim 1, wherein the first metric and the altered metrics are generated by:
   determining, for the original cell and for the alterations, whether a violation occurs at each position of the conductors of the second wiring layer; and
   calculating a number of violations of all positions of the conductors of the second wiring layer, for the original cell to produce the first metric and separately for each of the alterations to produce each of the altered metrics.

3. The method according to claim 1, wherein the repeating the offsetting offsets the conductors of the second wiring layer into all offset positions the conductors of the second wiring layer are capable of being moved as restricted by design constraints.

4. The method according to claim 1, wherein the altering only changes positions of the conductive circuit elements within the original cell and does not change position of the original cell within the second wiring layer.

5. The method according to claim 1, further comprising:
   placing the selected design feature in an integrated circuit design;
   routing connections between cells of the integrated circuit design;
   routing power connections from the second wiring layer to the selected design feature to produce a finalized integrated circuit design;
   generating masks from the finalized integrated circuit design;
   using the masks within manufacturing equipment to produce wafers; and
   dividing the wafers into integrated circuit devices.

6. The method according to claim 1, wherein the violations comprise spacing or overlap violations.

7. A method comprising:
   receiving a wiring layout of a first wiring layer and a second wiring layer in a multi-level integrated circuit design, wherein the first wiring layer is separated from the second wiring layer by an insulator layer;
   positioning an original cell having conductive circuit elements within the second wiring layer to align with connections through the insulator layer to the first wiring layer;
   identifying violations occurring when any of the conductive circuit elements of the original cell violate design rules relative to conductors of the second wiring layer, while the conductors of the second wiring layer are in an original position, wherein the original cell comprises an irregular pattern of the conductive circuit elements, and wherein the conductors are in a regular pattern in the second wiring layer separated by areas in the second wiring layer reserved for cells including the original cell;
   offsetting the conductors of the second wiring layer from the original position into different offset positions;
   repeating the identifying violations for each of the offset positions without moving the original cell in the second wiring layer;
   generating a first metric for the original cell based on all violations identified for the original position and each of the offset positions;
   altering the original cell or the second wiring layer to produce alterations by:
       altering the conductive circuit elements within the original cell that allow the original cell to maintain, relative to the original cell, a same functionality and a same alignment to the connections to the first wiring layer; or
       altering a pitch of the conductors of the second wiring layer;
   for each of the alterations, repeating the identifying violations, the offsetting, the repeating the identifying violations for each of the offset positions, and the generating, to produce altered metrics based on violations identified for the different offset positions for each of the alterations; and
   selecting the original cell or one of the alterations as a selected design feature based on the selected design feature producing a lowest number of violations of the design rules.

8. The method according to claim 7, wherein the first metric and the altered metrics are generated by:
   determining, for the original cell and for the alterations, whether a violation occurs at each position of the conductors of the second wiring layer; and
   calculating a number of violations of all positions of the conductors of the second wiring layer, for the original cell to produce the first metric and separately for each of the alterations to produce each of the altered metrics.

9. The method according to claim 7, wherein the repeating the offsetting offsets the conductors of the second wiring layer into all offset positions the conductors of the second wiring layer are capable of being moved as restricted by design constraints.

10. The method according to claim 7, wherein the altering only changes positions of the conductive circuit elements within the original cell and does not change position of the original cell within the second wiring layer.

11. The method according to claim 7, further comprising:
    placing the selected design feature in an integrated circuit design;
    routing connections between cells of the integrated circuit design;
    routing power connections from the second wiring layer to the selected design feature to produce a finalized integrated circuit design;
    generating masks from the finalized integrated circuit design;
    using the masks within manufacturing equipment to produce wafers; and
    dividing the wafers into integrated circuit devices.

12. The method according to claim 7, wherein the violations comprise spacing or overlap violations.

13. A system comprising:
    a design interface component having input components that receive logical operations from a designer;
    a generation component that automatically produces an integrated circuit design that accomplishes the logical operations from the designer; and
    manufacturing machines that produce integrated circuits according to the integrated circuit design,
    wherein the generation component comprises:
        a storage component that maintains a library of cells;
        a synthesis component that automatically selects cells of the integrated circuit design from the library of cells to perform the logical operations from the designer, and that automatically determines interconnections between the cells of the integrated circuit design;

a placement component that automatically places the cells of the integrated circuit design within a second wiring layer of a multi-level integrated circuit design, wherein the second wiring layer is separated from a first wiring layer by an insulator layer in the multi-level integrated circuit design; and a routing component that automatically routes conductors forming the interconnections between the cells of the integrated circuit design and forming connections between the cells of the integrated circuit design and power supplies in the second wiring layer, wherein the placement component automatically positions an original cell having conductive circuit elements within the second wiring layer to align with connections through the insulator layer to the first wiring layer, wherein the generation component automatically identifies violations occurring when any of the conductive circuit elements of the original cell violate design rules relative to conductors of the second wiring layer, while the conductors of the second wiring layer are in an original position, wherein the original cell comprises an irregular pattern of the conductive circuit elements, wherein the conductors are in a regular pattern in the second wiring layer separated by areas in the second wiring layer reserved for cells including the original cell, wherein the generation component automatically offsets the conductors of the second wiring layer from the original position into different offset positions, wherein the generation component automatically repeats identifying violations for each of the offset positions without moving the original cell in the second wiring layer, wherein the generation component automatically generates a first metric for the original cell based on all violations identified for the original position and each of the offset positions, wherein the generation component automatically alters the original cell or the second wiring layer to produce alterations by:

altering the conductive circuit elements within the original cell that allow the original cell to maintain, relative to the original cell, a same functionality and a same alignment to the connections to the first wiring layer; or altering a pitch of the conductors of the second wiring layer, wherein the generation component automatically, for each of the alterations, repeats the identifying violations, repeats offsetting the conductors of the second wiring layer, repeatedly identifies the violations for each of the offset positions, and repeats generating metrics, to produce altered metrics for each of the alterations, and wherein the generation component automatically selects the original cell or one of the alterations as a selected design feature based on the selected design feature producing a lowest number of violations of the design rules.

14. The system according to claim 13, wherein the first metric and the altered metrics are generated by the generation component automatically:

determining, for the original cell and for the alterations, whether a violation occurs at each position of the conductors of the second wiring layer; and calculating a number of violations of all positions of the conductors of the second wiring layer, for the original cell to produce the first metric and separately for each of the alterations to produce each of the altered metrics.

15. The system according to claim 13, wherein during repeating the offsetting, the generation component automatically offsets the conductors of the second wiring layer into all offset positions the conductors of the second wiring layer are capable of being moved, as restricted by design constraints.

16. The system according to claim 13, wherein during the altering, the generation component automatically only changes positions of the conductive circuit elements within the original cell and does not change position of the original cell within the second wiring layer.

17. The system according to claim 13, wherein the manufacturing machines use masks within manufacturing equipment to produce wafers, and divide the wafers into the integrated circuits.

* * * * *